United States Patent
Dumazy

(10) Patent No.: US 8,339,439 B2
(45) Date of Patent: Dec. 25, 2012

(54) METHOD OF SPEEDING UP VIDEO RECOVERY OF VIDEOTELEPHONY AFTER AN INTERRUPTION AND MOBILE TERMINAL AND SYSTEM USING THE SAME

(75) Inventor: Jean Dumazy, Paris (FR)

(73) Assignee: ST-Ericsson SA, Geneva (CH)

( * ) Notice: Subject to any disclaimer, the term of this patent is extended or adjusted under 35 U.S.C. 154(b) by 543 days.

(21) Appl. No.: 12/593,578

(22) PCT Filed: Mar. 19, 2008

(86) PCT No.: PCT/IB2008/051033
§ 371 (c)(1),
(2), (4) Date: Apr. 16, 2010

(87) PCT Pub. No.: WO2008/120124
PCT Pub. Date: Oct. 9, 2008

(65) Prior Publication Data
US 2010/0208668 A1   Aug. 19, 2010

(30) Foreign Application Priority Data

Mar. 29, 2007 (EP) ..................... 07290387

(51) Int. Cl.
*H04N 7/14* (2006.01)
(52) U.S. Cl. .................................. 348/14.02

(58) Field of Classification Search ............... 348/14.02, 348/14.11, 14.12, 14.15; 455/436, 439, 442
See application file for complete search history.

(56) References Cited

U.S. PATENT DOCUMENTS 6,498,809 B1   12/2002   Dean et al.
7,006,576 B1   2/2006   Hannuksela

OTHER PUBLICATIONS

PCT International Search Report PCT/IB2008/051033, mailing date, Oct. 9, 2008, pp. 2.

*Primary Examiner* — Stella L. Woo
(74) *Attorney, Agent, or Firm* — William J. Kubida; Peter J. Meza; Hogan Lovells US LLP

(57) ABSTRACT

Recovery or resynchronization of an ongoing videotelephony communication between a near terminal and a distant terminal is achieved with mechanisms between the radio connection protocol stack in control of the radio connection on network level and the videotelephony protocol stack which is responsible for handling the audio and video data of an ongoing videotelephony communication between the near and distant terminals. A videotelephony agent in the near terminal is aware of an absence the availability of the radio connection to the data network as may be caused by a UMTS handover, so that the videotelephony agent, after resumption of the videotelephony connection, requests the distant videotelephony agent to generate an independently encoded frame of the actual video image of the distant agent for fast resynchronization.

20 Claims, 4 Drawing Sheets

METHOD OF SPEEDING UP VIDEO RECOVERY OF VIDEOTELEPHONY AFTER AN INTERRUPTION AND MOBILE TERMINAL AND SYSTEM USING THE SAME

CROSS-REFERENCE TO RELATED APPLICATIONS

The present application is a national filing in the U.S. Patent & Trademark Office of PCT/IB2008/051033 filed Mar. 19, 2008, and claims priority of European Patent Application No. 07290387.5 filed Mar. 29, 2007, both of which applications are incorporated herein in their entireties by this reference.

FIELD OF THE INVENTION

The invention relates to a system and a method for recovery and resynchronization of a videotelephony communication, implementation of the method in hardware and/or software, and a corresponding mobile terminal comprising the method implemented in hardware and/or software.

In particular, the invention relates to recovery and resynchronization of an ongoing videotelephony communication connection or session after a handover in a data network.

BACKGROUND OF THE INVENTION

In this context, videotelephony (VT) in general concerns full-duplex, real-time audio-video communication between two or among several end users, where the communication consists of audio (e.g. speech) and video, or a combination of audio, data and video.

In the past, so-called videoconferencing was limited to the H.323 protocol for packet-based multimedia communications systems, which is basically a protocol suite defined by the International Telecommunication Union (ITU) Telecommunication Standardization Sector (ITU-T) for audio-visual communication sessions on any packet based data network, such as the internet, where voice transmission using the internet protocol (IP) is also known as Voice over IP (or VoIP in short). In addition to voice applications, H.323 provides mechanisms for video communication and data collaboration, in combination with the T.120 series standards of the ITU-T. In short, the H.323 specifies how real time services may be implemented over IP networks by means of basically three major steps, which are signalling under the H.225 protocol for agents to request access to the H.323 domain, signalling under the H.245 protocol for the call setup, including the media streams to be used, and, finally, data transport using real time protocol (RTP), which is an internet protocol standard defining a way for applications to manage real-time transmission of multimedia data.

The components under the H.323 architecture are terminal(s) (T), gateway(s) (GW), gatekeeper(s) (GK) and multipoint control unit(s) (MCU) for establishing multipoint conferences. Terminals represent the end devices of every communication connection, in which real time two-way communications with another H.323 terminal, gateway or multipoint control unit can be provided. Gateways establish the connection between the terminal(s) in the H.323 network and terminals belonging to networks using a different protocol stack, such as a public switched telephone network (PSTN). Gatekeepers are responsible for translating between telephone number and IP addresses, manage bandwidth, and provide mechanism for terminal registration and authentications.

Generally, there are five types of information exchange in the H.323 architecture, namely digitized audio (e.g. speech or voice), digitized video, data, communication control, controlling connections and sessions, where the main focus herein is the combination of audio and video for videotelephony.

Among the protocols contained in the H.323 protocol suite there are specialized protocols for video processing, for instance, the H.261, which contains video codecs for audio-visual services at P×64 kps, and the H.263, which concerns video coding for low bit rate communication. At the moment, the most commonly used video codecs are H.263 and its successor the H.264/MPEG-4 AVC.

In videotelephony, transmitted video data consists of a sequence of images, where an individual image is known by the expression "frame". For reduction of the video data amount to be transmitted, there are used three major types of encoded frames. First, an I-frame is basically one encoded still image, which consequently can individually be decoded in order to get back the full still image. Secondly, a P-frame is encoded as difference from one or more preceding I-frame(s) or P-frame(s). Thirdly, another frame type is a B-frame, which is also coded as differences, but either from preceding or from following I-frames or P-frames. Since the coding of P-frames and B-frames is based on coding of differences, it is, therefore, known as predictive video (en)coding, which on the one hand provides for data compression by removal of temporal redundancy in a video image sequence. However, on the other hand, is also one weak point for quality in case of disturbances during transmission of the video data.

Another protocol used for videotelephony by videophones is the H.324. A slightly modified version of H.324, which is also known as 3G-324M and which has been defined by 3rd generation partnership project (3GPP), is used by cell phones that allow video calls. At the moment typically use is made in packet based data networks of the Universal Mobile Telecommunications System (UMTS), such as the frequency division duplex (FDD), time division duplex (TDD) and low chip rate time division duplex (LCR-TDD) and beyond implementations of the UMTS. This standard comprises several sub-protocols that handle multiplexing and demultiplexing of speech, video, user, and control data (cf. H.223 protocol) as well as in-band call control (cf. H.245 protocol).

As it regards mobile videotelephony, the term "mobile" indicates that there is at least one mobile terminal, which is connected via a radio link or radio connection. Accordingly, errors may be induced in the video bit streams caused by interferences. As mentioned before, users readily notice audio and video interruptions and/or corruptions. Thus, user experienced video quality can significantly be degraded when corruption lasts for several seconds, depending on the frequency of transmitted I-frames. However, using higher frequency of I-frames is not desired due to I-frame requiring more bandwidth than B- or P-frames.

For example, videotelephony in an UMTS environment relies on a synchronous bearer at 64 kbps with no retransmission at the radio link control (RLC) layer, also called RLC in transparent mode (RLC-TM). The UMTS bearer supports sending and receiving burst of twice 80 bytes every 20 ms. For each burst, there may be one voice frame, which is independent from the previous bursts, and one part of a video frame. Voice frames are independent from each other at 20 ms pace because voice codec is based on a pseudo-stationary voice scheme at 20 ms for adaptive multi-rate (AMR) coding and 30 ms for voice coding according to the G723.1 protocol. The videotelephony bearer relies on the UMTS protocol stack and the videotelephony session relies on the videotelephony protocol stack of the H.245 protocol, which protocols are independent. The H.245 stack is normally transparent for the UMTS protocol stack.

The H.245 protocol stack serves for control of multimedia communication by messages and procedures used for opening and closing logical channels (multiplexed paths between the endpoints used for data transfer) for audio, video and data, capability exchange, control and indications. After a connection has been set up via the call signalling procedure, the H.245 call control protocol is used to resolve the call media type and establish the media flow, before the call can be established. By the H.245 protocol the call is also managed after it has been established. There are several logical channel procedures provided by the H.245 protocol, which are used for opening and closing logical channel. Further, the H.245 provides for among others the "Video fast update"-command, which corresponds to the above mentioned "VideoFastUpdate"-request and which is used for requesting updates for video frames, in case of data loss.

As discussed above, video frames may rely on previous video frames except of I-frames. During an intra-RAT (radio access technology) UMTS hard handover, it may happen that the interruption time of the bearer is more than 100 ms. In some cases, interruption of the bearer may last several seconds in case radio link interruption and radio link failure. Further, the distant bearer (i.e., of the distant) terminal is not aware of this interruption as long as the bearer is considered as established by the network. Moreover, none of the communicating parties of an ongoing videotelephony connection are usually aware of this interruption time when the bearer is back.

That is to say, as I-frames are not generated too often, for the above-discussed reason of bearer bit rate limitation, generally, in cases of an interruption of the bearer, e.g. caused by a handover, it may take some time to get back a proper video after the interruption of the bearer is completed.

SUMMARY OF THE INVENTION

Hence, it is an object of the invention, to speed up video recovery, i.e. resynchronization, of an ongoing videotelephony communication after an interruption.

In particular, it is an object of the invention to provide a method, a system and a mobile terminal implementing the method, which provide better resynchronization of an ongoing videotelephony communication when an interruption of a radio communication connection used by the mobile terminal occurs.

It is another object of the invention to reduce the noticeable interruption time in an ongoing videotelephony communication when an interruption of a radio communication connection used by the mobile terminal occurs.

It is yet another object of the invention to provide for a faster recovery of the perceived video quality after an interruption.

Further to achieve at least one of the objects of the invention it is provided a system for implementation of mobile videotelephony functionality providing videotelephony communication according to claim 1.

According to a first aspect of the invention, it is provided a system for implementation of mobile videotelephony functionality providing videotelephony communication via a data network, wherein the system comprises radio access means for a radio connection to the data network and for communicating with at least one distant terminal via the data network, and wherein the system further comprises:

videotelephony control means connected to decoding means for decoding of received video data from a distant terminal, and connected to encoding means for encoding of video data to be sent to the distant terminal;

connected to the radio access means, detecting means for detecting an interruption of an actual, i.e. current, radio access connection, wherein the detecting means are configured to inform the videotelephony control means about an interruption of the radio access connection; and wherein the videotelephony control means are configured, after resumption of the radio access connection, to send an request message to the distant terminal for generation of an independently encoded video frame by the distant terminal for resynchronization of the videotelephony communication at the mobile terminal comprising the system.

In one embodiment the system is implemented as a chip set which may be one or several chips having interconnections between them. Further, it is noted that all particular functions of the system may be realized by software to control dedicated hardware components. Further, it is noted that the term chip set may also comprise embodiments, in which all functions are implemented in one single chip.

According to another aspect of the invention, to achieve at least one object of the invention it is provided a method for resynchronization of a videotelephony communication according to claim 11.

Accordingly, it is provided a method for resynchronization of a videotelephony communication after an interruption, between communicating videotelephony agents via a data network, wherein one of the videotelephony agents is a near agent, which is a mobile agent with radio access to the data network and which is communicating with at least one distant agent, wherein the method comprises:

the near agent detecting an interruption of the videotelephony communication, and after resumption of the videotelephony connection, requesting the distant agent to generate an independently encoded video frame of the videotelephony communication for resynchronization of the videotelephony communication at the near agent.

Summarizing, it is proposed that mechanisms are implemented between the radio connection protocol stack, which is in control of the radio connection of the near agent with the data core network, and the videotelephony protocol stack, which is responsible for handling the audio and video data of the ongoing videotelephony communication between the near and distant agent, such that the near videotelephony agent becomes aware of an interruption in or, more general, the availability of the used radio connection to the data network. In this context, the detection of an interruption of the videotelephony connection comprises, by the near agent, detecting the presence of a bearer, e.g. UMTS bearer, of the used radio access connection to the data network.

It is noted that the step of requesting generation of an independently encoded video frame, is not to be understood as systematic. In other words, such a request may be based on some algorithm, which, for instance, considers decoder error detection or the duration of an interruption, for triggering the request.

As it regards the aspect data network, it goes without saying that this applies to circuit switched or packet switched networks as well as combinations thereof. For instance, in one certain embodiment an UMTS network is used, as an exemplary embodiment for a radio access network, where the radio connection protocol stack is an UMTS protocol stack. In this case, i.e., in the example of an UMTS network, the radio connection or link to the data network corresponds to an UMTS bearer. The core network may be an Internet protocol (IP) based network, such as the Internet.

The videotelephony control means are in one embodiment implemented by a videotelephony controller. The radio access means are in one embodiment a radio access unit of the mobile terminal. The decoding means and encoding means are in one embodiment a decoder and an encoder, respectively. However, it is noted that these function may be implemented by separated dedicated chips or by programmable hardware and software, as well as by any combination thereof. The detecting means for detecting an interruption of an actual radio access connection are in one embodiment a detector, which is configured an interruption of an actual, i.e., current radio access connection.

In one typical application of the proposed solution, the interruption of the videotelephony communication is caused by a handover of near agent from a first radio access connection to another radio access connection to the data network. Another or additional application the proposed solution, is the interruption due to bad radio conditions or due to radio link failure.

In a further embodiment, the method further comprises, in response to the detected interruption, by the near agent, stopping refreshing of an actual displayed frame of the videotelephony communication at the near agent, in order to avoid degradation of the actual displayed video image due to missing frames. In other words, this may be achieved by having the decoder decoding the same frame such that the displayed picture is frozen. Accordingly, "frozen image" can be understood as reproducing a still image on the display when the near agent visualizes the last correct video frame received form the far agent.

In yet a further embodiment, the method may further comprise, in response to the detected interruption, by the near agent, holding video encoder means, such as a video encoder implemented in a dedicated hardware chip or by a software routine of the near agent. In this context, "holding of the encoder means" is to be understood as pausing or stopping the encoding of taken images by the camera means, since due to the interruption the thus generated video frames could not be sent to the distant videotelephony agent and would just fill a transmitter video buffer as pending video frames, which would produce further delays after resumption of the connection. However, it is also possible that the encoder still encodes.

In a further advantageous embodiment, the method may further comprise, after resumption of the bearer of the radio access connection, generating an independently encoded video frame at the near agent, and sending the independently encoded video frame to the distant agent for resynchronization of the videotelephony communication at the distant agent. Since the near agent is aware of the situation, by this measure the noticeable interruption time in the ongoing videotelephony communication at the distant agent can be reduced.

In yet another advantageous embodiment, the method may further comprise, in response to the detected interruption, by the near agent, flushing of actual pending videotelephony frames to be transmitted from the near agent to the distant agent. In one embodiment, pending frames may be stored in a transmitter video buffer, i.e. pending frames are queued in a buffer and waiting to be transmitted, are cleared or dropped, which avoids further delays due to the needed time to send such frames after resumption of the radio connection, due to the fact that such frames are already outdated at this point in time.

As it regards, the requesting of the distant agent by the near agent to generate the independently encoded frame for resynchronization this may be performed by sending of an message or command, such as the "VideoFastUpdate"-H.245, from the near agent to the distant agent, after resumption of the videotelephony communication.

Accordingly, in the context of frame encoding and decoding, most video communication protocols provide a command and control protocol that includes a video recovery mechanism called "VideoFastUpdate". Such a "VideoFastUpdate"-request signals to the far agent, e.g., a terminal or a server, transmitting video data to encode the next video frame as an I-frame, i.e. to encode the next frame based on the content of the current video image only.

As it regards the proposed system, in a preferred embodiment the system comprises a camera interface to video camera means, such as a video camera, which in one embodiment comprises a digital image sensor and respective optics, for receiving consecutive images captured by the video camera means, e.g., from the user, at the mobile terminal to be transmitted as video data in the videotelephony communication.

Accordingly, in one embodiment, the videotelephony control means of the system are configured, after resumption of the videotelephony connection, to send an independently encoded video frame from the actual image captured by the video camera means to the distant terminal for resynchronization of the videotelephony communication at the distant terminal.

As discussed in connection with the method, the system may comprise memory means or a memory, for instance in the form of a transmitter buffer, for storing pending frames of an ongoing videotelephony communications to be transmitted to the distant terminal of the videotelephony communication and wherein the videotelephony control means are further configured, upon detection of an interruption of the radio access connection to the data network, to flush, i.e. to clear the memory means, or at least avoid use of the pending frames.

Moreover, in the preferred embodiment, the system comprises a display interface to a display or display means, such as a digital display of the LCD or TFT type, for connection to the video decoding means and is used for supplying decoded videotelephony data to be displayed, i.e. the images of the videotelephony communication taken at the distant terminal. Accordingly, the videotelephony control means may further be configured, upon detection of an interruption of the radio access connection to the data network, to inform or control the display means via the display interface to stop refreshing, i.e., freeze, an actual displayed video image of the videotelephony communication, i.e., to display a still image. In a certain embodiment this feature is implemented by not refreshing a display buffer.

Accordingly, the basic idea is to inform the videotelephony agent about absence of the radio connection, e.g. an UMTS bearer, which is, for instance, caused by an handover, e.g. an inter-RAT UMTS handover between two radio cells for the radio connection controlled by different radio network controllers, so that the videotelephony agent is able to freeze the actual displayed video image. After resumption of the videotelephony connection, i.e. re-establishment of radio connection, e.g. the UMTS bearer, the near videotelephony agent may have its encoder to generate an independently encoded frame of the actual video image, i.e. an I-frame in the terminology of the H.32x protocol family, which enables a fast resynchronization of the distant videotelephony agent.

Moreover, the near videotelephony agent may request the distant videotelephony agent to generate an independently encoded frame of the actual video image of the distant agent, i.e. an I-frame in the terminology of the H.32x protocol family, for fast resynchronization. This may be performed by a "VideoFastUpdate"-message or command, respectively, as for example available in the H.245 protocol.

In other words, one essential aspect resides in the use or application of a fast video update function between the communicating agents, i.e. the communicating videotelephony agents. However, it is to be noted that this is enabled by exchange of information about the availability of a used physical communication connection, such as an UMTS bearer, between the videotelephony control and the control of the physical network connection, such as the UMTS bearer control, wherein videotelephony control and the physical connection control are two different entities.

Such "VideoFastUpdate"-request signals to the terminal (or a server) transmitting video data to encode the next video frame as an I-frame, i.e. to encode the next frame based on the content of the current video frame only, which allows the video quality to be restored quickly. As a result, by a "VideoFastUpdate" any interruption may be limited to a very short period of time. As shorter the time needed to recover an ongoing video communication as less notice the involved user will take thereof.

These and other aspects of the invention are apparent from and will be elucidated with reference to the embodiments described hereinafter.

It will be appreciated that the solution may, basically, be used in any kind of data network, i.e., in circuit switched, in packet switched networks and any combinations thereof. Accordingly, the invention may be used by compatible user equipment, as terminals or mobile phones that support videotelephony over circuit switched (CS) and/or packet switched (PS) connections.

BRIEF DESCRIPTION OF THE DRAWINGS

The invention will be described in greater detail hereinafter, by way of non-limiting examples, with reference to the embodiments shown in the drawings.

Figure 1:
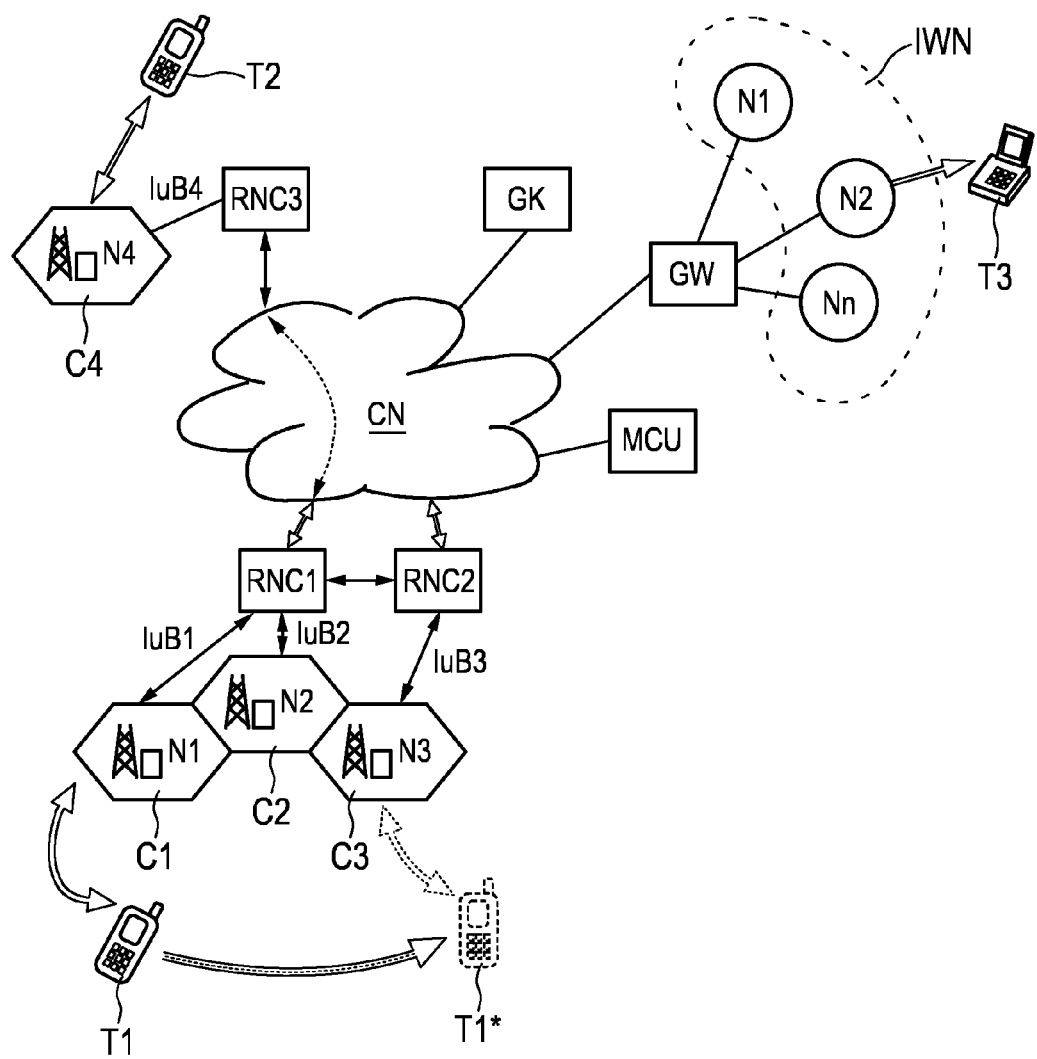
FIG. 1 shows a schematic overview of general network architecture for videotelephony communication via a data network with at least on party being a mobile terminal.

The Figures are schematically drawn and not true to scale, and identical reference numerals in different figures, if any, refer to corresponding elements. It will be clear for those skilled in the art that alternative but equivalent embodiments of the invention are possible without deviating from the true inventive concept, and that the scope of the invention is limited by the claims only.

DETAILED DESCRIPTION OF PREFERRED EMBODIMENTS

FIG. 1 shows a schematic overview of general network architecture for videotelephony communication via a data network with at least one party being a mobile terminal. As already stressed above, in the following a network in accordance to the UMTS standard is used as an example for a radio access network providing access for at least one mobile terminal to a core network, which may be the internet. Basically, the communicating terminals can be connected via circuit switched connections, e.g. via ISDN (integrated services digital network), or via packet switched connections, e.g. the Internet, or combinations thereof.

In other words, the methods and references to existing protocols of relevant standards are herein described for illustrative purposes only. The methods described are generic and apply to the processing of video in a multimedia terminal for videotelephony communications. A person skilled in the relevant art will recognize that alternative and equivalent steps, configurations and arrangements may be used without departing from the present invention as defined in the attached claims.

Accordingly, in FIG. 1 there is a mobile terminal T1, which has an ongoing videotelephony communication with another mobile terminal T2. Both terminals T1 and T2 are in the context of an UMTS environment so-called terminals in accordance to the H.32x protocol family as published by the ITU-T. In other words, the terminals are able to run an H.32x stack with respective multimedia applications on top.

In this context, the primary purpose of the H.32x protocol family is to enable interworking of multimedia terminals which may be connected to different network types via the core network CN, such as switched circuit networks (SCN), wireless networks, H.310 or H.321 terminals of a B-ISDN network, H.320 terminals of an ISDN network, or H.322 terminals of local networks.

In FIG. 1, the mobile terminal T1 is connected via a first radio cell C1 of the UMTS access network, which radio cell C1 is served by a first base station or node-B N1 connected via interface luB1 with a first radio network controller RNC1. The RNC1 provides a connection to the core network CN. The dotted line through the core network CN indicates schematically the path of the video communication data routed through the network between the communicating terminals T1 and T2.

The mobile terminal T2 is also connected to the core network CN via the UMTS access network, comprised of the radio cell C4 served by base station N4, which is controlled by and connected to the core network CN via radio network controller RNC3.

A gateway GW is shown in FIG. 1, which is for connecting two dissimilar networks, which are very general depicted as interworking networks IWN. For instance, the H.32x gateway GW may provide connectivity between an H.32x network and a non-H.32x network N2. For example, the gateway GW connects and provides communication between the H.324 terminal T1 and a H.323 videotelephony terminal T3 connected to the circuit switched network (SCN) N2, which includes all switched telephony networks such as the public switched telephone network (PSTN). In short, the connectivity of dissimilar networks is achieved by translating protocols for call setup and release, converting media formats between the different networks, and transferring information between the networks connected by the gateway GW. The gateway GW is not required, however, for the communication between two terminals T1 and T2 on the H.32x network environment as shown in FIG. 1.

Further in FIG. 1, there is shown a gatekeeper GK, which may be a focal point for all calls within the H.32x networks. Although the gatekeeper GK is not mandatory required, the GK may provide important services such as addressing, authorization and authentication of terminals and gateways, bandwidth management, accounting, billing, as well as charging. Moreover, the gatekeeper GK may also provide call-routing services.

Furthermore, in FIG. 1 is also illustrated a multipoint control unit MCU, which may provide support for conferences of three or more H.32x terminals, e.g. a conference communication between the Terminals T1, T2, and T3. All terminals participating in the conference establish a connection with the MCU, which manages conference resources, negotiates between the terminals for the purpose of determining the audio or video coder/decoder (CODEC) to use, and may handle the media stream. It is worth noting, that the gatekeeper GK, the gateway GW, and the MCU are logically separate components of the H.32x standard, but may in principle be implemented as a single physical device.

As terminals T1 and T2 in this example are assumed to be mobile terminals, an ongoing videotelephony communication between the two terminals T1 and T2 may be interrupted in the event of a handover. This is illustrated in FIG. 1 by the terminal T1 moving along the arrow to a new location which belongs to radio cell C3 of the UMTS access network. In the new location, terminal T1 is indicated as terminal T1*.

Radio cell C3 is served by a node-B N3, which is controlled by and connected to the core network CN via radio network controller RNC2. Accordingly, pursuant to triggering preconditions, handover of the terminal T1 from node-B N1, controlled by RNC1, to node-B N3, controlled by RNC2, is performed, which is also known as a inter-RAT UMTS handover.

As already mentioned above, videotelephony in the UMTS environment is carried on a synchronous bearer at 64 kbps with no retransmission at the radio link control (RLC) layer. The UMTS bearer supports sending and receiving burst of 160 bytes every 20 ms. For each burst, there is one voice frame that is independent from the previous bursts and one part of a video frame. Voice frames are independent from each other at 20 ms pace. Whilst the videotelephony bearer relies on the UMTS protocol stack, the videotelephony session relies on the videotelephony protocol stack in accordance to the H.245 protocol. Both protocols, however, are independent from each other. In particular the H.245 stack is normally transparent for the UMTS protocol stack.

As discussed above, most video frames, i.e. P-frames and B-frames, in a videotelephony communication, are dependent from previous video frames, except I-frames. During an intra-RAT (radio access technology) UMTS hard handover at the mobile terminal T1, as illustrated in FIG. 1, it may happen that the interruption time of the bearer is above 100 ms. As already mentioned above, such an interruption may last several seconds in case of a radio link interruption or a radio link failure.

Moreover, the distant bearer (i.e. the bearer of the distant) terminal T2 is even not aware of this interruption as long as the bearer is considered as established by the UMTS network. Also, none of the communicating terminals T1 and T2 of the ongoing videotelephony connection is aware of this interruption time when the bearer is back. Accordingly, since I-frames are not generated often for the reason of bearer bit rate limitation, it may take some time to get back a proper video, i.e. until the video displayed at each terminal T1 and T2 is synchronized again, i.e., is resynchronized.

In accordance with the invention, mechanisms are implemented between the UMTS protocol stack and the videotelephony protocol stack so that the videotelephony agent is made aware of the availability of the UMTS bearer. That means, in the mobile terminal T1 the respective videotelephony control means is connected with a detecting means, such as a detector, for detecting the presence of the UMTS bearer. Alternatively, when the radio access network informs the UMTS protocol stack of the terminal about a handover to be going to in progress, the respective software routines in the terminal may be modified such that the videotelephony protocol stack is also informed about an interruption to happen next.

Accordingly, the videotelephony means in the terminal can by arranged to flush outstanding frames and to freeze the video encoder as well as the display, when the interruption starts. Then, after the inter-RAT handover, when the UMTS bearer is back, the videotelephony communication is quickly resumed by requesting the encoder at the distant terminal T2 to generate an I-frame when interruption finishes. This request to the encoder of the distant VT agent can be performed by means of a H.245 "VideoFastUpdate"-message. Moreover, the terminal T1 may also send after the handover an I-frame to the distant terminal T2 for the same purpose, namely to enable the terminal T2 to immediately resynchronize the video of the videotelephony communication.

Figure 2:
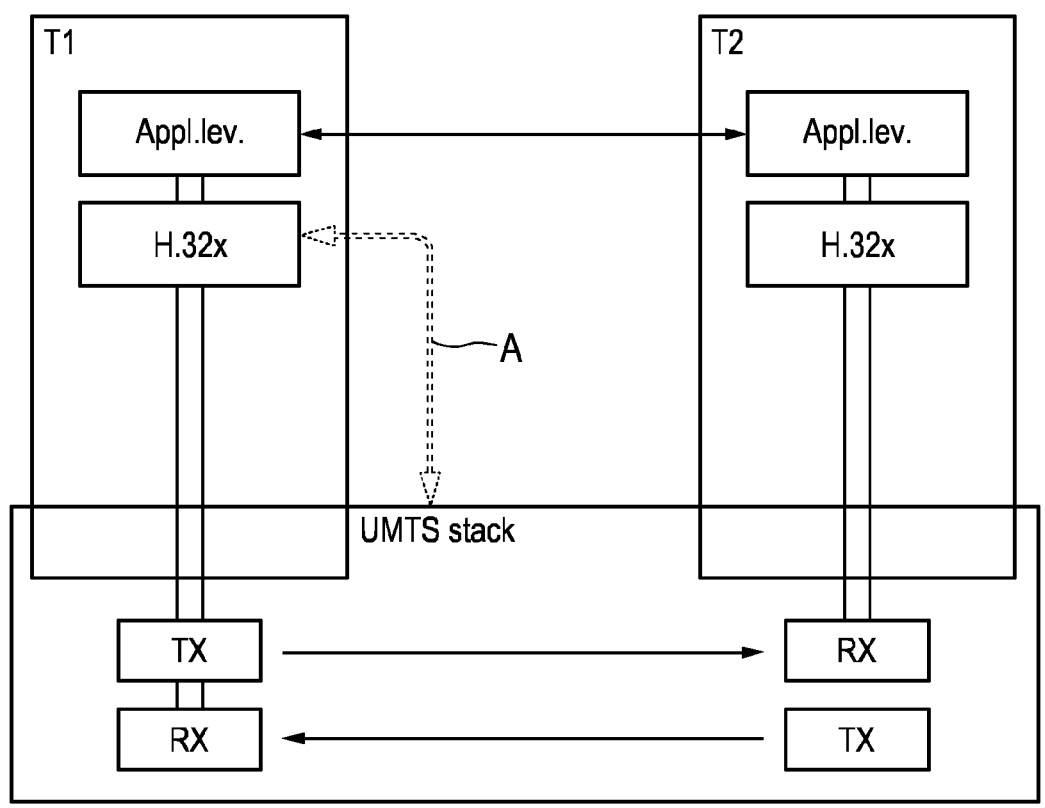
FIG. 2 illustrates schematically, by way of an example, the videotelephony protocol stack in accordance to the H.32x protocol family, which set up on top of the UMTS protocol stack on network level, at the terminal-side of terminal T1 and T2.

FIG. 2 illustrates schematically, by way of an example, the videotelephony protocol stack in accordance to the H.32x protocol family, which set up on top of the UMTS protocol stack on network level, at the terminal-side of terminal T1 and T2.

Firstly, on top of the protocol stacks is the application level, which basically comprises the audio, video as well as the terminal's call manager applications.

Further, there is provided at least one audio codec, which encodes the audio signal from the microphone for transmission on the transmitting H.32x terminal and decodes the received audio code that is sent to the speaker on the receiving H.32x terminal. Audio communication is the minimum service provided by the H.32x standard. Hence, all H.32x terminals must support at least one audio CODEC as specified in the ITU-T G.711 recommendation (audio coding at 64 kbps). Additional audio CODEC recommendations may also be supported by the terminal, such as G.722 (64, 56, and 48 kbps), G.723.1 (5.3 and 6.3 kbps), G.728 (16 kbps), and G.729 (8 kbps).

Furthermore, there is provided at least one video codec, which encodes video from the camera means for transmission on the transmitting H.32x terminal and decodes received video code that is sent to the video display on the receiving H.32x terminal. Any H.32x terminal providing video communications, i.e. videotelephony must support video encoding and decoding as specified in the ITU-T H.261/H.263 recommendations.

A protocol for registration, admission, and status (RAS), e.g. the H.225 protocol, is the protocol between the endpoints terminals T1 and T2. The RAS protocol is used to perform registration, admission control, bandwidth changes, status, and disengage procedures between terminals T1 and T2. Basically, the H.225 call signalling is used to establish a connection between two H.32x endpoints by exchanging H.225 protocol messages on a call-signalling channel.

Moreover, control signalling, e.g. in accordance with the H.245 protocol, is used to exchange end-to-end control messages governing the operation of the H.32x endpoint, i.e. the terminal T1 or T2. Possible control messages carry information related to inter alia capabilities exchange, opening and closing of logical channels used to carry media streams, flow-control messages, general commands and indications. The H.242 also provides for a video fast update command, which is useable for requesting updates for video frames, in case of data loss.

On the network level a real-time transport protocol (RTP) is used which provides end-to-end delivery services of real-time audio and video, as required in particular in videotelephony. Whereas H.32x protocols are used to transport data over packet based data networks (IP networks), the RTP is typically used to transport data via the user datagram protocol (UDP). The counterpart of RTP is the real-time transport control protocol (RTCP), which provides control services. The primary function of RTCP is to provide feedback on the quality of the data distribution. Other RTCP functions include carrying a transport-level identifier for an RTP source, called a canonical name, which is used by receivers to synchronize audio and video.

In FIG. 2, the arrow A indicates the information exchanges between the UMTS protocol stack as the network level radio connection protocol stack and the videotelephony protocol stack handling the audio and video data of an ongoing videotelephony communication on application level between the near and the distant terminal.

Figure 3:
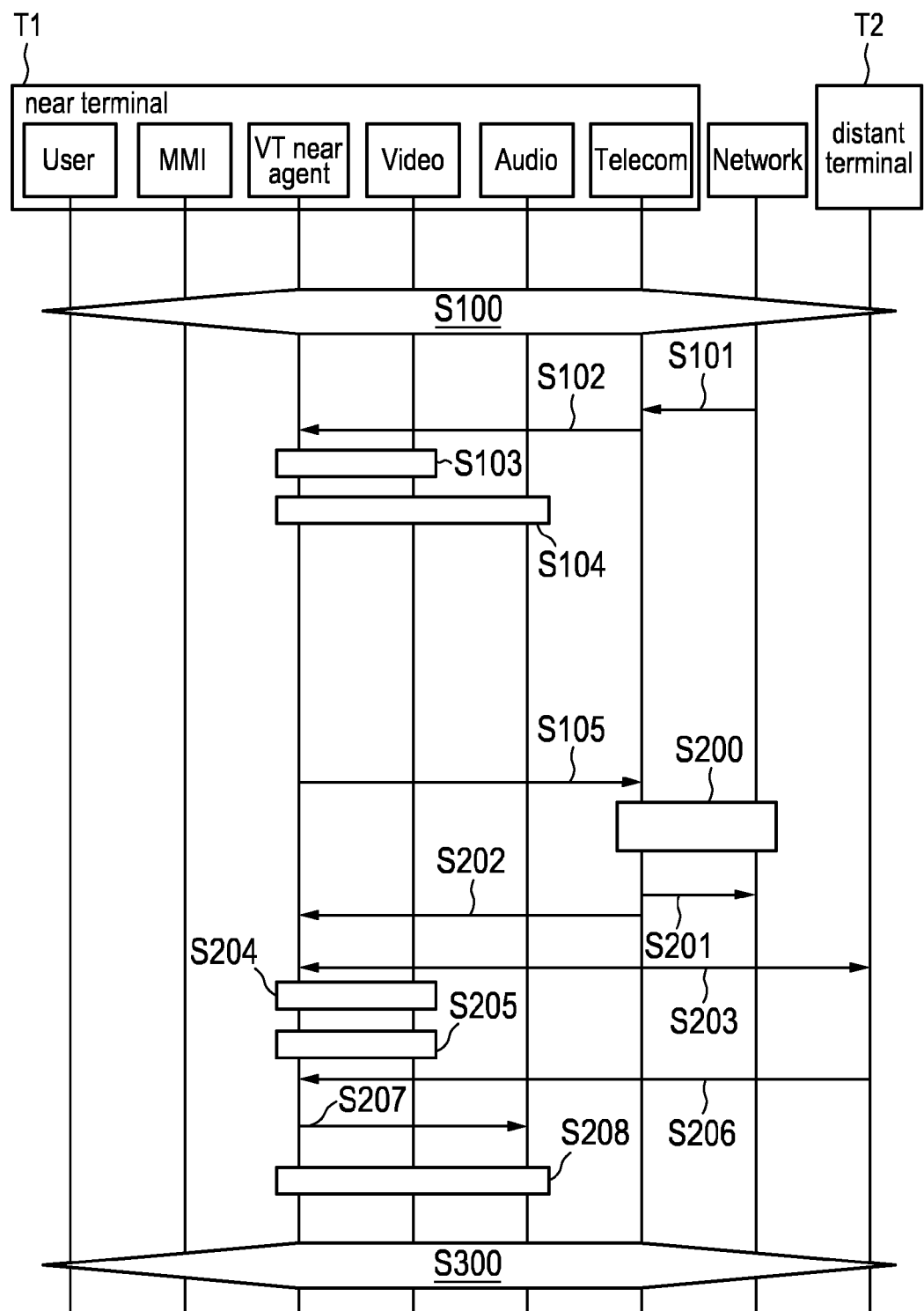
FIG. 3 shows a schematic flow chart of a working example in accordance with the preferred embodiment of the invention and the typical application scenario.

FIG. 3 shows a schematic flow chart of a working example in accordance with the preferred embodiment of the invention and the typical application scenario.

On top of FIG. 3 are listed entities involved in an ongoing videotelephony communication. The near end terminal T1 comprises the man machine interface (MMI), the videotelephony near agent with the videotelephony (VT) stack and the control of the resources, the functional block with all encode/decode acquisition and rendering capabilities (Video), the functional block with audio codecs and audio path capabilities (Audio), and the network level protocol stack (Telecom), i.e. all what is in contact with the network. There is further, a box depicting the network itself as the communication link between the communicating terminals T1 and T2. Finally, there is a box representing the distant (or far-end) terminal T2 that is the communication peer part of the near terminal T1. Accordingly, the distant terminal T2 comprises corresponding entities MMI, VT agent, Video, Audio, and Telecom.

In connection with FIG. 1, which illustrates a particular situation of an UMTS environment, to which the proposed solution can be applied, the situation in step S100 corresponds to situation in FIG. 1, where the mobile terminal T1 is served by node-B N1 of the UMTS radio access network. That is to say, in step S100 terminals T1 and T2 are assumed to have an ongoing videotelephony communication. However, it is to be noted that the proposed solution can be applied at any stage as soon as the UMTS bearer is established.

As discussed with reference to FIG. 1, the terminal T1 is moving from the coverage area of radio cell C1 into the coverage area of radio cell C3, which triggers an inter-RAT UMTS hard handover. Accordingly, in step S101 the network sends a respective handover command to the UMTS protocol stack of the near terminal T1. Consequently, the UMTS protocol stack is informed in advance on the following handover, or—more general—about a radio link failure or radio link interruption. However, as discussed above, the videotelephony protocol stack and the respective video and audio applications are not aware of the occurring interruption in the radio connection from the terminal to the UMTS radio access network.

The Telecom entity of the terminal T1 sends in response to the handover command from the network in step S102 a respective interruption request to the videotelephony agent, i.e. the videotelephony application in the terminal T1. Accordingly, in step S103, the actual encoding session of the video encoder may be stopped and in S104, the audio encoder session may be stopped, too.

As the UMTS bearer is interrupted due to the inter-RAT UMTS handover, the near end terminal does neither receive nor send any video or audio data of the videotelephony communication. Hence, the far-end picture at the distant terminal is frozen because decode is always running and decoding the same frame. Also UMTS bearer buffer provides all the outstanding video and audio data blocks received before the handover, typically one block, to the videotelephony terminals for decoding and rendering. Accordingly, preview may still be running if existing.

Then, in step S105, according to a first aspect of the invention, the videotelephony agent running at the terminal T1 is flushing or avoids using pending video frames, i.e. cleaning or clearing the outstanding buffers in the videotelephony terminals as well as imaging, if any. In other words and more general, the principle is to avoid having any outstanding H.223 frame into any buffer, i.e. intermediate memory or storage, that could lead to end to end video and/or audio trip delay(s) at resumption of the connection.

During the handover, as discussed above, no videotelephony data will be transmitted between the communicating peers, i.e. terminals T1 and T2. Hence as any new data will be queued in UMTS bearer buffers, it is advantageous that the videotelephony terminals make sure not to send anything to keep the end-to-end delay as low as possible. Accordingly, the flushing of these buffers according to one aspect of the invention aims to make sure to empty the possible outstanding buffer.

In step S200, in the UMTS application stack the network connection is re-established, that is to say the terminal T1 has established an UMTS bearer of the radio cell C3 served by node-B N3 of FIG. 1. Then, in step S201, the telecom entity signals to the network that the handover has been completed. Accordingly, in step S202, the videotelephony agent of the terminal T1 is informed by, for example, a restart request to start audio and video decoding and encoding again.

Now, in step S203 according the main aspect of the present invention, the videotelephony agent of terminal T1 sends a "VideoFastUpdate"-message of the H.245 protocol to the distant terminal. As explained above, the distant terminal is not aware about the interruption caused by the handover and therefore would not be sending an independently encoded image, which however is needed for a fast resynchronization of the video at the display of the terminal T1.

In step S204, the videotelephony agent of the terminal T1 starts again video encoding, i.e. taking or capturing images by the camera means in the terminal T1, usually from the user of the terminal T1. In step S205, according to a third aspect of the invention, the videotelephony agent in the terminal T1 requests or commands its own video encoder to generate an independently encoded image, i.e. an I-frame. This step substantially corresponds to the "VideoFastUpdate"-message send to the distant terminal T2. The purpose of the I-frame generated at the terminal T1 immediately after the handover is to enable the videotelephony agent at the distant terminal T2 to quickly resynchronize its displayed video.

In step S206, in response to the "VideoFastUpdate"-message in step S203, the requested I-frame is received by the terminal T1 with a first H.223 frame, which may also contain an audio frame.

In step S207, the first writing of video data to the transmitter buffer, that is to say of the I-frame generated in accordance to step S205, takes place. For instance, the first AMR (adaptive multi rate) frame is written in IF2 (interface format) format, when starting audio encoding and decoding in step S208. However, it is noted that stopping (S104) and starting (S204) of audio encoding and decoding, respectively, is not an essential part for implementation of the herein proposed solution.

Finally, the videotelephony communication session between the two terminals T1 and T2 is proceeded from step S300.

For implementation of the method according to the present invention as well as of a terminal implementing the method, it should be appreciated that the invention may be fully implemented in software, to be executed by at least one dedicated processor of the terminal. That is to say, the relevant method steps of the method according to the present invention may be transformed into respective software code or commands, which can be is stored in a memory of the terminal hardware, which memory is accessible by the at least one processor. Accordingly, the software commands when read by the processor will cause the processor in connection with the relevant periphery of the terminal system to perform the steps of the method according to the invention.

Figure 4:
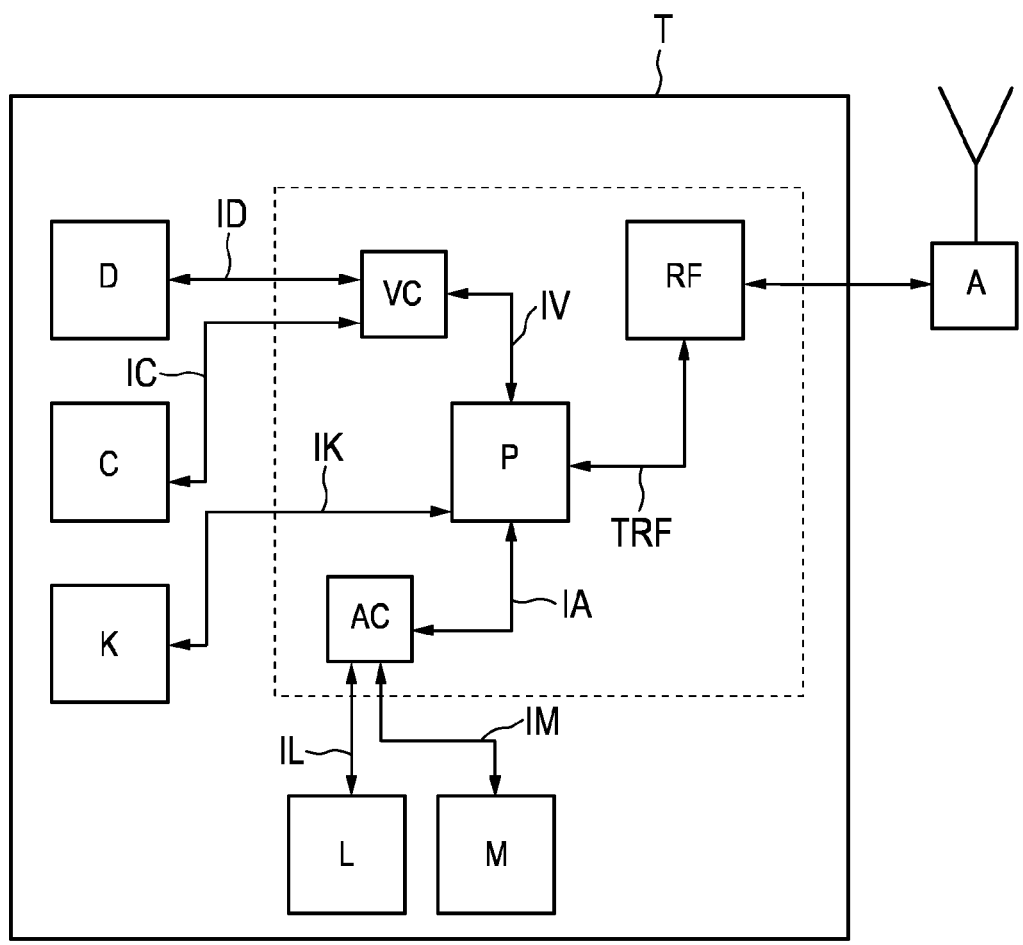
FIG. 4 shows a schematic block diagram of a terminal comprising the system according to the invention.

With reference to FIG. 4, a schematic block diagram of a terminal T is depicted which may comprise the circuit or may be considered as implementation of the presented solution by a combination of hardware and software. Thus, the main purpose of FIG. 4 is to illustrate a possible implementation of the herein presented solution by way of an example, but it goes without saying that a person skilled is aware of equivalent approaches.

Further, the mobile terminal T comprises videotelephony circuitry implemented by a central processing unit or processor P. Such a processor P can be a specialized processor for mobile applications, which basically also implements some kind of operation system for the application level, on which applications as the videotelephony application can be implemented.

Further, the processor P has a connection via a respective interface IV to a dedicated video chip VC implementing the required video codecs. The video chip VC comprises a display interface ID to a display of the terminal T for reproducing video images at the terminal, which have been decoded by the video chip. The video chip VC has further a camera interface IC for connection to a video camera of the terminal T, which interface IC provides captured video images to the video chip VC, which are encoded by the video chip in accordance to at least one video codec as specified in the ITU-T H.261/H.263 or H.264, MPEG4 recommendations.

Further, the terminal T comprises a dedicated audio chip AC implementing the required audio codecs, such as specified in the ITU-T G.711 recommendation (audio coding at 64 kbps), alternatively or additionally the audio chip AC may also support audio according to G.722 (64, 56, and 48 kbps), G.723.1 (5.3 and 6.3 kbps), G.728 (16 kbps), and G.729 (8 kbps). The audio chip VC has further a microphone interface IM for connection to a microphone M of the terminal T, which interface IA provides recorded audio signals such as speech from the user of the terminal T to the audio chip AC. Furthermore, there the audio chip AC has a interface IL to a loudspeaker of the terminal to produce decoded audio data at the terminal T to be listened by the user thereof.

Furthermore, there are means for input of commands or data by a user of the terminal, which are here, as an example, represented by a keyboard or keypad K.

In general, the display D, camera C, microphone M, the loudspeaker L, and the keypad K may be summarized as the man-machine-interface MMI (as shown in FIG. 3).

Moreover, there is a radio frequency part RF of the terminal T, which is at least connected with one or more antennas A for transmitting and/or receiving of radio signals, during having access to a respective radio access network, such as the UMTS radio network. In FIG. 4, the radio frequency part RF is connected by a radio interface IRF with the processor P. It should be noted, that FIG. 4 is a very schematic representation, the purpose of which is to provide a whole picture of the principle architecture of a mobile terminal T according to the invention.

Finally, it goes with out saying that the above-described functionalities realized in dedicated hardware chips may also be implemented in one or a more or less different number of components in comparison to FIG. 4, but implementation by means of software-routines, which are to be carried out, for example, by the processor P. That is to say, the solution may be implemented by a computer program product for resynchronization of a videotelephony communication, after an interruption, between communicating videotelephony agents via a data network, wherein one of the videotelephony agents is a near agent, which is a mobile agent with radio access to the data network and which is communicating with at least one distant agent. Accordingly, the computer program product comprises code means for causing a processor to execute the steps as defined herein in connection with the proposed method.

Accordingly, for a fast recovery or resynchronization of an ongoing videotelephony communication between the near terminal and the distant terminal of the communication, the respective system comprised of the processor and the software implements the mechanisms between the radio connection protocol stack, in the example an UMTS protocol stack (FIG. 2), which is in control of the radio connection on network level, and the videotelephony protocol stack (FIG. 2), which is responsible for handling the audio and video data of an ongoing videotelephony communication, between the near and the distant terminal. As a result, the videotelephony agent or application in the near terminal is aware of the availability of the used radio connection to the data network, i.e. the UMTS bearer, an absence of which may be caused by an inter-RAT UMTS handover or any other interruption of the connection of the used physical connection to the data network.

Accordingly, the videotelephony application, after resumption of the videotelephony connection, will requests the distant videotelephony application at the distant terminal to generate an independently encoded frame of the actual video image of the distant agent for fast resynchronization. Moreover, the videotelephony application of the near terminal may also after resumption of the videotelephony connection, send an independently encoded frame of the actual video image of the near terminal to the distant terminal for fast resynchronization Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprise" and its conjugations do not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

The invention claimed is:

1. A system for implementation of videotelephony functionality providing videotelephony communication via a data network, wherein the system comprises radio access means for a radio connection to the data network and for communicating with at least one distant terminal via the data network, and wherein the system further comprises:
videotelephony control means coupled to decoding means for decoding of received videotelephony data from a distant terminal, and coupled to encoding means for encoding of videotelephony data to be sent to the distant terminal;
coupled to the radio access means, detecting means for detecting an interruption of an actual radio access connection, wherein the detecting means is configured to inform the videotelephony control means about an interruption of the radio access connection;
wherein the videotelephony control means is configured, after resumption of the radio access connection, to send a request message to the distant terminal for generation of an independently encoded video frame by the distant terminal for resynchronization of the videotelephony communication at a mobile terminal comprising the system.

2. The system according to claim 1, further comprising a camera interface to video camera means for receiving consecutive images captured by the video camera means at the mobile terminal comprising the system, wherein the captured images are to be transmitted as video data in an ongoing videotelephony communication to the distant terminal.

3. The system according to claim 2, wherein the videotelephony control means are further configured, after resumption of the videotelephony connection, to send an independently encoded video frame from an actual image captured by the video camera means to the distant terminal for enabling resynchronization of the videotelephony communication in the distant terminal.

4. The system according to claim 1, further comprising memory means for storing pending frames of the ongoing videotelephony communications; and wherein the videotelephony control means is further configured, upon detection of an interruption of the radio access connection to the data network, to flush or to avoid use of the pending frames in the memory means.

5. The system according to claim 1, further comprising a display interface to display means for connection with the video decoding means and for supplying decoded videotelephony data to be displayed; and wherein the videotelephony control means is further configured, upon detection of an interruption of the radio access connection to the data network, to inform the display means via the display interface to stop refreshing of an actual displayed video frame of the videotelephony communication.

6. The system according to claim 1, wherein the data network is a network based on circuit switched and/or packet switched connections and wherein the radio access is established via a radio access network to the data network.

7. The system according to claim 1, wherein the radio access connection is a radio bearer.

8. The system according to claim 1, wherein the is implemented by circuitry in one single chip or in a chip set comprising a plurality of chips.

9. A mobile terminal for videotelephony communication via a data network with at least one distant terminal via the data network, wherein the mobile terminal comprises a system according to claim 1.

10. The mobile terminal according to claim 9, wherein the mobile terminal is configured for communication via a radio access network providing radio access to the data network.

11. A method for resynchronization of a videotelephony communication, after an interruption, between communicating videotelephony agents via a data network, wherein one of the videotelephony agents is a near agent, which is a mobile agent with radio access to the data network and which is communicating with at least one distant agent, wherein the method comprises:
the near agent detecting an interruption of the videotelephony communication, and
the near agent, after resumption of the videotelephony connection, requesting the distant agent to generate an independently encoded video frame of the videotelephony communication for resynchronization of the videotelephony communication at the near agent.

12. The method according to claim 11, wherein the method further comprises:
in response to the detected interruption, by the near agent, freezing of an actual displayed frame of the videotelephony communication at the near agent.

13. The method according to claim 11, wherein the method further comprises,
in response to the detected interruption, by the near agent, holding a video encoder of the near agent.

14. The method according to claim 13, wherein detecting an interruption of the videotelephony connection comprises, by the near agent, detecting presence of a bearer of the radio access connection.

15. The method according to claim 14, wherein the method further comprises:
after resumption of the bearer of the radio access connection, generating an independently encoded video frame at the near agent, and
sending the independently encoded video frame to the distant agent for resynchronization of the videotelephony communication at the distant agent.

16. The method according to claim 11, wherein the method further comprises, in response to the detected interruption, by the near agent, flushing of pending videotelephony frames to be transmitted from the near agent to the distant agent.

17. The method according to claim 11, wherein the interruption is caused by a handover of the near agent from a first radio access connection to another radio access connection to the data network.

18. The method according to claim 11, wherein requesting the distant agent to generate the independently encoded frame for resynchronization is performed by sending a message or command for a fast video update from the near agent to the distant agent.

19. The method according to claim 18, wherein the data network is a network providing a radio access that complies with H.324 specifications, and wherein the message or command for a fast video update is a "VideoFastUpdate"-message in accordance to the H.245 protocol.

20. A computer program product for resynchronization of a videotelephony communication, after an interruption, between communicating videotelephony agents via a data network, wherein one of the videotelephony agents is a near agent, which is a mobile agent with radio access to the data network and which is communicating with at least one distant agent, wherein the computer program product comprises code computer program for causing a processor to execute the steps as defined in the method of claim 11.

* * * * *